3,416,928
PELLETED RUMINANT FEEDSTUFF
Thomas E. Freese, Indianapolis, Ind., assignor to Allied Chemical Corporation, New York, N.Y., a corporation of New York
No Drawing. Filed Jan. 12, 1966, Ser. No. 520,097
4 Claims. (Cl. 99—2)

ABSTRACT OF THE DISCLOSURE

Production of a free-flowing, non-segregating, urea-feed mixture which can be pelleted more readily by employing urea prills within a size range such that at least 90% are between 12 and 30 mesh, at least 5% of the total prills being less than 20 mesh and at least 70% being greater than 20 mesh.

---

This invention relates to the production of pelleted ruminant feedstuffs. More particularly, it relates to the production of pelleted feedstuffs employing a urea prill material comprising large and small prills in the size range of 12 to 30 mesh.

It is well-known that ruminant animals have the unique ability of utilizing nonprotein-nitrogenous compounds. This is accomplished by the symbiotic relationship between microorganisms which multiply in the rumen and reticulum of ruminant animals which actually utilize the nonprotein-nitrogen and convert it into organismal protein which can in turn be digested and absorbed by the animal. For some thirty years, it has been known that a portion of the protein requirements of ruminants can be supplied by urea. The rumen microflora convert the urea nitrogen into protein utilizable by the ruminants. The substitution of urea for part of the more expensive natural protein feedstuffs makes possible savings in the formulation of ruminant feeds. However, the incorporation of the hygroscopic urea in feeds leads to mixes and finished pellets having poor storage characteristics. Often it is difficult to remove such products from bulk bins because of caking and resulting bin sets. It is known that the caking tendency can be somewhat reduced by additional drying of the feeds and/or by adding conditioning agents such as clays to the finished products. However, these methods often are expensive and frequently result in dusty products. Replacement of urea by its less hygroscopic, but more costly, autocondensation products has proven to be economically unattactive and nutritionally unsound in some formulations. There is, therefore, a continued need for improvement in such formulations when urea is employed.

It is an object of this invention to provide a process for the production of feedstuffs containing urea that have reduced caking tendency and bin set.

It is another object of this invention to provide a process for the production of pelleted urea-containing feedstuffs whereby the pelleting rate is substantially increased.

These and other objects will be obvious from the description of the invention that follows.

Briefly stated, the objects of this invention are accomplished by mixing a urea prill material which contains at least 90% by weight of prills within the size range that said prills will pass through a 12 mesh screen and are retained on a 30 mesh screen, at least 5% of the total prills being less than 20 mesh and at least 70% being greater than 20 mesh (U.S. Standard Screen Series) with other ruminant feed ingredients to form a free-flowing, nonsegregating mixture which is compressed into pellets by conventional means.

We have found when urea prills of the size range indicated above are added to ruminant feed formulations and pelleted, finished pellets result that have excellent storage properties as compared to the poor storage properties normally encountered on incorporating urea into these compositions. Moreover, the prilled urea significantly increases the pellet production rates, an unexpected improvement since urea-containing feedstuffs are normally pelleted with considerable difficulty. Additionally, the mixture of urea prills of this invention and ruminant feed ingredients is essentially non-segregating prior to pelleting which is a very important feature when the mixture is to be handled by conventional equipment.

The particular size range of urea prills is of critical importance to the present invention. For example, pelleting of mixtures of feedstuffs containing urea pellets much larger than 12 mesh is difficult because the relatively large particles of urea used interfere with passage of the feed mixture through the pelleting dies. In addition, segregation of the urea is a problem during blending operations prior to pelleting. On the other hand, crystalline urea or microprilled forms of urea smaller than 30 mesh tend to break down to a liquid form when subjected to the very extreme pressures and temperatures of the ruminant feed pelleting operations. When urea is transformed from a solid to a liquid state in the pelleting act, it is transformed later to a solid state, either in the cooling or curing phase that the pellets go through. After the pellet is formed, liquid urea within the pellet migrates to the outer surface where it reforms. This results in the pellets sticking together, resulting in high bin set and causing the feed manufacturing trade a great many handling problems.

In the present process, a specific combination of both large and small particles is employed eliminating the adverse effects usually encountered by causing these adverse effects to neutralize each other; that is, in the present invention, the relatively small sizes of urea prills in the mix dissolve to some extent and actually aid in lubricating the mash as it passes through the die resulting in an improved rate of production. Concurrently, the larger prills in the mix do not dissolve, tend to inhibit any appreciable formation of liquid phase and are lubricated sufficiently to pass through the die of the pellet mill intact thereby dramatically reducing the bin set phenomenon when the mix has been pelleted.

In the feed trade, segregation of ingredients is a serious problem, particularly as it affects guaranteed analysis. This problem is aggravated in the case of concentrated feed ingredients such as urea in which a small amount of segregation is significant. When the urea prills of this invention are added to a ruminant feed, there is no segregation of urea during handling operations, such as conveying operations, prior to actual pelleting. In fact, the unpelleted mix may be used as is for ruminant feed without danger of segregation if this is desired.

The urea prills of the invention are incorporated with typical feed ingredients well known in the art such as corn gluten, grains, meals, etc. in conventional amounts usually ranging from 1% to 12% by weight, depending upon the desired final composition and nutritional balance of the feed.

Pelleting may be accomplished by any of known means employing conventional equipment and pellets of various sizes, as desired, may be formed.

The following examples, in which all parts are by weight, are given for the purpose of further illustrating this invention.

Example 1

A ruminant supplement feed was prepared by mixing the following:

| | Parts |
|---|---|
| Linseed meal | 100 |
| Soybean meal | 979 |
| Cottonseed meal | 300 |
| Corn gluten feed | 100 |
| Wheat bran | 100 |
| Calcium carbonate | 30 |
| Dicalcium phosphate | 30 |
| Trace mineral salt | 30 |

To one-half of the above mixture was added 150 parts of molasses, and the mixture was agitated until the molasses was thoroughly blended. The mixture was passed through a 6 mesh screen to break up all agglomerates. To the screened mixture was added 62.5 parts of urea prill material comprising about 94% by weight of prills in the size range that the prills pass through a 12 mesh screen and are retained on a 30 mesh screen. At least 5% of the total prills were less than 20 mesh and at least 70% were greater than 20 mesh. The mixture was tumbled for forty-five minutes to assure good mixing.

A portion of the resulting ruminant feedstuff was dropped from a height of about 18″ into an 8″ by″ Pyrex tray 2″ in depth from a mechanical feeder to simulate the action of feed meal being dropped into a storage silo. When the tray was filled, a heavy cardboard separator was pushed into the mass dividing the cross sectional area into nine portions (each about ⅝ inches square) and the contents of each section was removed separately. The center section, a corner section and a middle outside section on the opposite side from the corner section were finely ground and assayed for urea nitrogen. The center section analyzed 3.7% urea nitrogen, the corner section 3.8% urea nitrogen, and the middle side section 3.7% urea nitrogen.

These data indicate there was little or no tendency for the urea to segregate during handling of the unpelleted ruminant feed mixture.

Example 2

A pelleted ruminant feedstuff was prepared in accordance with the invention as follows. About 28 pounds of 12 to 30 mesh prilled urea, defined in Example 1, was mixed with about 372 pounds of a basal cattle feed mixture to provide about 7% urea and about 50% total protein equivalent. The total mixture contained the following:

| Component: | Pounds |
|---|---|
| Urea | 28 |
| Gluten feed | 32 |
| Salt | 16 |
| Defluorinated phosphate | 12 |
| Limestone | 36 |
| Molasses | 12 |
| Added water | 4 |
| Standard middlings | 4 |
| Linseed meal | 4 |
| Cottonseed meal | 124 |
| Soybean meal | 128 |
| | 400 |

The batch was mixed in a vertical mixer and in a high-speed blender.

After mixing the batch, the mix was heated to about 50° C. with steam and pelleted with a California pellet machine using a 12/64 inch die. The pellets were cooled to ambient temperature in a horizontal conveying-screen cooler prior to storage. The finished pellets exiting the cooler contained 7% urea, 3% molasses, 50% protein equivalent, and about 9% moisture. The highest practical production rate was found to be 3,080 pounds per hour. The pelleted feed required a 22-pound weight to break down the pack when evaluated in a bin set storage test.

BIN SET TEST

The bin set test was designed to indicate the caking tendency of finished cattle feed pellets on storage in large bulk bins. In the bin set test, the uncured pellets from the cooler were poured into a cylindrical form about 7.5 inches I.D. by 18 inches until the form was almost filled. Two 50-pound weights, flat sections of round stock machined to fit in the form, were placed on the pellets. After four days at ambient temperature, the weights and then the form retaining the pellets were removed. Weights were then added in one-pound increments on top of the pellets, and the weight required to break the pack noted. The lower the weight required, the lower the bin set and caking tendency.

Example 3

A similar feed formulation to that of Example 2 was made up except that 30 pounds of 30–100 mesh crystal urea conditioned with 9% kaolin clay and wheat flour and containing 42% nitrogen was used as the nonprotein nitrogen source in the mix. (This formulation corresponds to commercially available urea sold especially for use in preparing a pelleted ruminant feedstuff.) The procedure of Example 2 was employed and the finished pellets again contained 7% urea, 3% molasses, 50% total protein, and about 9% moisture. These pellets required a 43-pound weight to break the bin set in the pack test described in Example 2. Using the crystal urea, the practical pellet production rate for the die and formulation was about 2,730 pounds per hour as compared to 3,080 pounds per hour when employing the 12 to 30 mesh prills of urea of this invention.

It can thus be seen that the present invention substantially overcomes the bin set problem, produces a non-segregating product and increases the rate of pellet production.

I claim:

1. A ruminant feedstuff which is non-segregating and free-flowing which comprises a ruminant feed in admixture with a urea prill material which consists of at least 90% by weight of prills of the size that will pass through a 12 mesh screen and are retained by a 30 mesh screen, at least 5% of the total prills being less than 20 mesh and at least 70% of the total prills being greater than 20 mesh.

2. A ruminant feedstuff as described in claim 1 wherein 94% by weight of said prills will pass through a 12 mesh screen and are retained by a 30 mesh screen.

3. A pelleted ruminant feedstuff having improved resistance to bin set when stored which comprises a ruminant feed in admixture with a urea prill material which consists of at least 90% by weight of prills of the size that will pass through a 12 mesh screen and are retained by a 30 mesh screen, at least 5% of the total prills being less than 20 mesh and at least 70% of the total prills being greater than 20 mesh.

4. In a process for producing pelleted ruminant feedstuffs which comprises admixing urea and ruminant feed ingredients and compressing said mixture into pellets, the improvement which comprises admixing said urea in the form of a urea prill material which consists of at least 90% by weight of prills of the size that will pass through a 12 mesh screen and are retained by a 30 mesh screen, at least 5% of the total prills being less than 20 mesh and at least 70% of the total prills being greater than 20 mesh.

References Cited

UNITED STATES PATENTS

| 3,248,255 | 4/1966 | Belasco et al. | 99—2 |
| 3,249,441 | 5/1966 | Reynolds et al. | 99—2 |

A. LOUIS MONACELL, *Primary Examiner.*

N. ROSKIN, *Assistant Examiner.*

U.S. Cl. X.R.

99—6